(12) United States Patent
Foster, II et al.

(10) Patent No.: US 10,703,557 B2
(45) Date of Patent: Jul. 7, 2020

(54) DRUMS FOR TRANSPORTING AND FEEDING WIRE

(71) Applicant: Illinois Tool Works Inc., Glenview, IL (US)

(72) Inventors: Donald Q. Foster, II, Troy, OH (US); Robert K. Dragoo, St. Paris, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 64 days.

(21) Appl. No.: 15/616,680

(22) Filed: Jun. 7, 2017

(65) Prior Publication Data

US 2018/0354710 A1   Dec. 13, 2018

(51) Int. Cl.
| | |
|---|---|
| *B65D 85/04* | (2006.01) |
| *B65H 49/08* | (2006.01) |
| *B23K 9/133* | (2006.01) |
| *B65D 85/672* | (2006.01) |
| *B65H 75/02* | (2006.01) |

(52) U.S. Cl.
CPC .............. *B65D 85/04* (2013.01); *B23K 9/133* (2013.01); *B65H 49/08* (2013.01); *B65D 85/672* (2013.01); *B65H 75/02* (2013.01); *B65H 2701/36* (2013.01)

(58) Field of Classification Search
CPC ...... B65D 85/04; B65D 85/672; B65H 49/08; B65H 49/12; B65H 75/02; B23K 9/133; B23K 9/1333
USPC ...... 206/389–416; 242/128–129, 137, 137.1, 242/160.2, 170–172, 588.3
See application file for complete search history.

(56) References Cited

U.S. PATENT DOCUMENTS

| | | | |
|---|---|---|---|
| 439,622 A | 11/1890 | Bastin | |
| 2,713,938 A * | 7/1955 | Snyder | B65D 85/04 206/395 |
| 2,867,319 A | 1/1959 | Jones | |
| 3,014,577 A | 12/1961 | Bruestle | |
| 3,246,815 A | 4/1966 | Aronson | |
| 3,602,455 A * | 8/1971 | Lewis | B65H 49/08 206/509 |
| 3,998,326 A * | 12/1976 | McKee, Jr. | B65D 85/04 206/407 |

(Continued)

FOREIGN PATENT DOCUMENTS

| | | |
|---|---|---|
| EP | 0693440 | 1/1996 |
| FR | 2969940 | 7/2012 |

(Continued)

OTHER PUBLICATIONS

ELCo Enterprises, Inc., "Wire Wizard Welding Products", Catalog #10-316, Updated May 3, 2017, 56 pages.

*Primary Examiner* — J. Gregory Pickett
*Assistant Examiner* — Brijesh V. Patel
(74) *Attorney, Agent, or Firm* — McAndrews, Held & Malloy, Ltd.

(57) ABSTRACT

A drum for transporting and feeding welding wire may comprise a hold-down bar opening. The hold-down bar opening enables access to and removal of a hold-down bar without requiring prior removal of an end surface of the drum or a drum lid. The drum may also comprise an access door. The access door enables access to the interior space of the drum when it is opened or removed from the first end surface. The access door allows for retrieval of a portion of a wire stored within the drum without need to remove an end surface of the drum or a drum lid.

18 Claims, 6 Drawing Sheets

(56) References Cited

U.S. PATENT DOCUMENTS

| | | |
|---|---|---|
| D256,370 S | 8/1980 | Ichikawa et al. |
| D256,999 S | 9/1980 | Haagedoorn et al. |
| D257,321 S | 10/1980 | Voorhees, Jr. |
| 4,451,014 A | 5/1984 | Kitt |
| 4,591,110 A | 5/1986 | Wirts |
| 4,623,063 A * | 11/1986 | Balkin .................. B65D 85/04 206/303 |
| 4,914,792 A | 4/1990 | Bradt |
| D313,340 S | 1/1991 | Stathis et al. |
| 5,103,977 A * | 4/1992 | Douglas ............... B65H 75/364 206/388 |
| 5,165,543 A * | 11/1992 | Heyda .................... B65D 85/04 206/400 |
| 5,299,706 A * | 4/1994 | Wardell, Jr. ........... B65D 51/24 220/254.1 |
| 5,494,160 A * | 2/1996 | Gelmetti ................. B65D 5/10 206/395 |
| 5,738,209 A * | 4/1998 | Burr ...................... B65D 85/04 206/397 |
| D395,950 S | 7/1998 | Friedman |
| 6,016,911 A * | 1/2000 | Chen .................. B65D 5/46024 206/395 |
| D428,796 S | 8/2000 | Van Ochten |
| D450,563 S | 11/2001 | Leonardi, Sr. |
| 6,715,608 B1 | 4/2004 | Moore |
| 7,191,968 B2 * | 3/2007 | Kuper ................... B23K 9/133 206/409 |
| 7,222,734 B2 * | 5/2007 | Barton .................. B65D 85/04 206/389 |
| D569,349 S | 5/2008 | Preston |
| D631,730 S | 2/2011 | Skillman |
| 8,235,210 B2 * | 8/2012 | De Lacerda ........... B65H 49/12 206/393 |
| D682,909 S | 5/2013 | Kim |
| D695,524 S | 12/2013 | Manderino |
| D698,228 S | 1/2014 | Chance et al. |
| 8,668,086 B2 * | 3/2014 | Gelmetti ................ B65H 49/12 206/393 |
| D707,106 S | 6/2014 | Gagnon |
| 8,931,638 B2 * | 1/2015 | Weissbrod ............ B65D 25/20 206/397 |
| 8,936,210 B2 | 1/2015 | Ma et al. |
| D727,854 S | 4/2015 | Chance et al. |
| D803,666 S | 11/2017 | Morley |
| D826,055 S | 8/2018 | Augustyniak et al. |
| 10,118,755 B2 | 11/2018 | Adams |
| 2003/0042163 A1 * | 3/2003 | Cipriant ............... B65D 5/5033 206/408 |
| 2004/0155090 A1 | 8/2004 | Jensen |
| 2005/0145534 A1 | 7/2005 | Steeber |
| 2005/0263640 A1 * | 12/2005 | Vanderslice ......... B65D 85/672 242/588.3 |
| 2006/0196989 A1 * | 9/2006 | Bartley ................. B65H 49/08 242/601 |
| 2012/0168554 A1 * | 7/2012 | Blunt .................... B65D 85/04 242/588.2 |
| 2013/0284843 A1 * | 10/2013 | Mertesdorf ........ B65H 75/4402 242/397 |

FOREIGN PATENT DOCUMENTS

| | | | |
|---|---|---|---|
| FR | 2969940 A1 * | 7/2012 | ............ B23K 9/133 |
| GB | 404114 | 1/1934 | |
| WO | 02094493 | 11/2002 | |

* cited by examiner

DRUMS FOR TRANSPORTING AND FEEDING WIRE

FIELD

The present disclosure generally relates to containers used to transport and feed welding wire and, in particular, to drums used to transport and feed welding wire for continuous welding processes.

BACKGROUND

During welding, the changeover from existing welding wire to new welding wire can be both complicated and time-consuming. Continuous welding processes allow welding wire to be continuously fed in order to avoid interruptions, thus simplifying the process and improving efficiency. Although continuous welding processes are known, continuous welding is often difficult in practice. There is a need for simplification and improvement of continuous welding processes.

SUMMARY

According to one aspect of the present disclosure, a drum for transporting and feeding welding wire has an outer surface that: defines an interior space, is centered around a longitudinal axis, extends along the longitudinal axis, and at least substantially surrounds a wire having proximal and distal ends. The drum further comprises a first end surface at an angle to the longitudinal axis. The first end surface comprises a wire feeding opening. The drum also comprises a hold-down bar to limit movement of the coiled wire during transport. The outer surface of the drum comprises a hold-down bar opening to allow at least one end of the hold-down bar to protrude out beyond the outer surface of the drum.

According to another aspect of the present disclosure, a drum for transporting and feeding welding wire defines an interior space and comprises a first end surface. The first end surface of the drum comprises an access door defined at least in part by a gap in the first end surface that extends from a wire feeding opening of the first end surface toward a circumference of the drum. The access door is configured to enable access to the interior space of the drum when it is opened or removed from the first end surface.

According to another aspect of the present disclosure, a drum for transporting and feeding welding wire comprises an outer surface centered around a longitudinal axis. The drum extends along the longitudinal axis and at least substantially surrounds a coiled wire. The drum comprises an end surface at an angle to the longitudinal axis. The end surface comprises a wire feeding opening and an access door that extends from the wire feeding opening. The access door is configured to enable access to the interior space of the drum when it is opened or removed from the end surface.

According to another aspect of the present disclosure, a method for continuously feeding welding wire comprises the steps of: (a) providing first and second drums, each drum having: (1) a wire having proximal and distal ends coiled around a longitudinal axis defining a space around the longitudinal axis; (2) an outer surface centered around the longitudinal axis, extending along the longitudinal axis, and at least substantially surrounding the coiled wire; and (3) an end surface at an angle to the longitudinal axis, wherein the end surface comprises an access door and a wire feeding opening, wherein the proximal end of the wire protrudes through the wire feeding opening; (b) placing the second drum in proximity to the first drum; (c) opening the access door of the first drum to define a first drum hole; (d) retrieving the distal end of the wire from the first drum; (e) pulling the distal end of the wire from the first drum through the first drum hole; (f) retrieving the proximal end of the wire from the wire feeding opening of the second drum; and (g) joining the distal end of the wire from the first drum to the proximal end of the wire from the second drum.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following is a description of the examples depicted in the accompanying drawings. The figures are not necessarily to scale, and certain features and certain views of the figures may be shown exaggerated in scale or in schematic in the interest of clarity or conciseness.

The following reference characters are used in this specification:
10 Drum
11 End surface
12 Drum body
13 Drum lid
14 Wire feeding opening
15 Access door
16 Edge
17 Finger hole
18 Outer surface
19 Hold-down bar opening
20 Drum
25 Access door
30 Welding wire
32 Starting or proximal end
34 Finishing or distal end
35 Anti-tangle ball
40 Interior space
50 Hold-down bar
60 Welding wire
62 Starting or proximal end
64 Finishing or distal end
70 Hold-down bar The foregoing summary, as well as the following detailed description, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

In the following detailed description, specific details may be set forth in order to provide a thorough understanding of embodiments of the present disclosure. However, it will be clear to one skilled in the art when disclosed examples may be practiced without some or all of these specific details. For the sake of brevity, well-known features or processes may not be described in detail. In addition, like or identical reference numerals may be used to identify common or similar elements.

Figure 1:
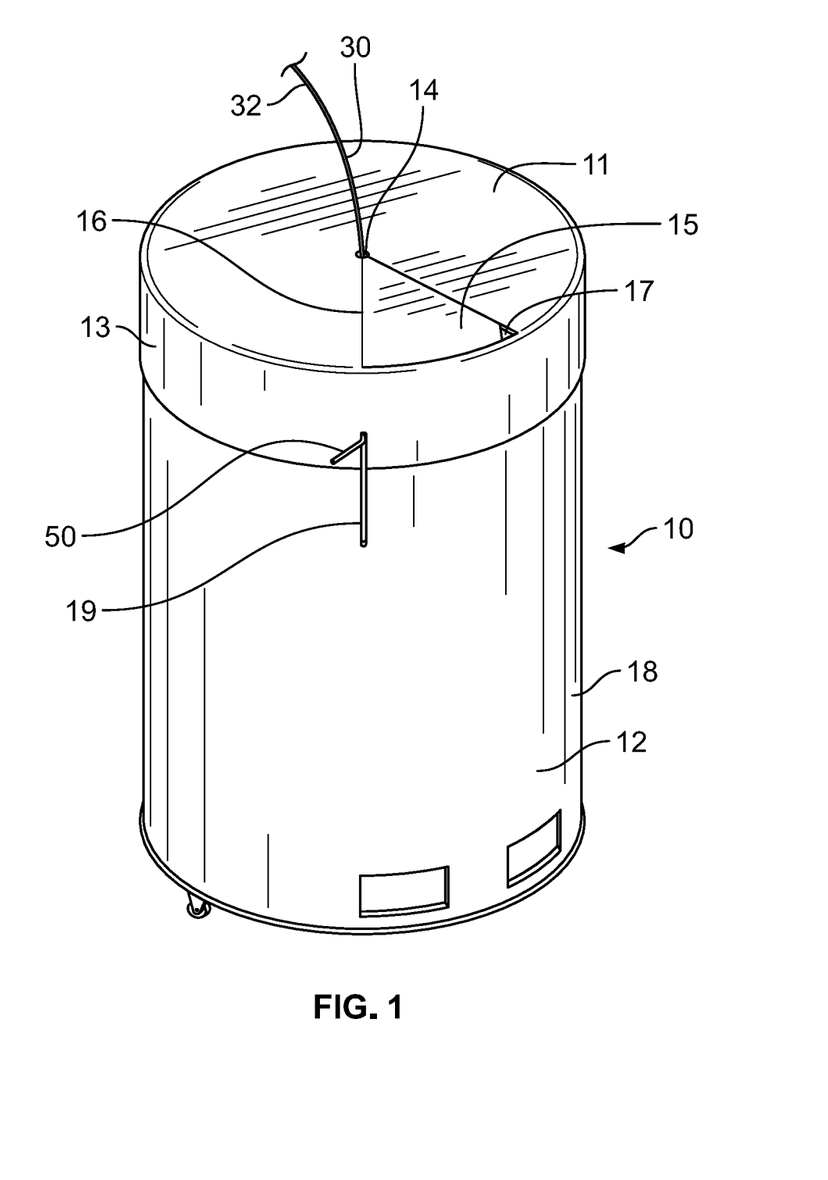
FIG. 1 is a perspective view of a welding wire drum showing the access door in a closed position.

As shown in FIG. 1, a drum 10 has an end surface 11 and an outer surface 18. The example drum 10 is substantially cylindrical in shape. In an alternative embodiment, the drum 10 may be shaped, for example, as a hexagonal prism or octagonal prism. The example drum 10 comprises a drum body 12 and a drum lid 13. In an alternative embodiment, the drum 10 may be a single piece. The example drum lid 13 is removable from the drum body 12. The drum 10 may be made of a recyclable material, such as fiber or cardboard.

Figure 2:
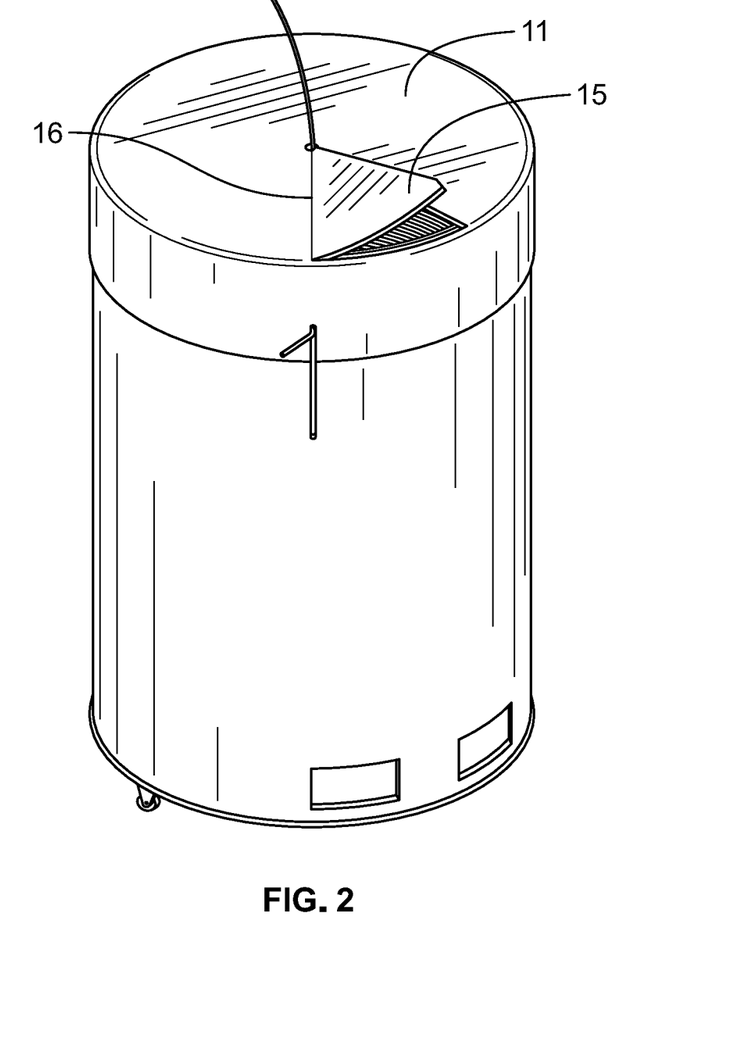
FIG. 2 is a perspective view of a welding wire drum showing the access door in an open position partially pivoted about a hinge.
Figure 3:
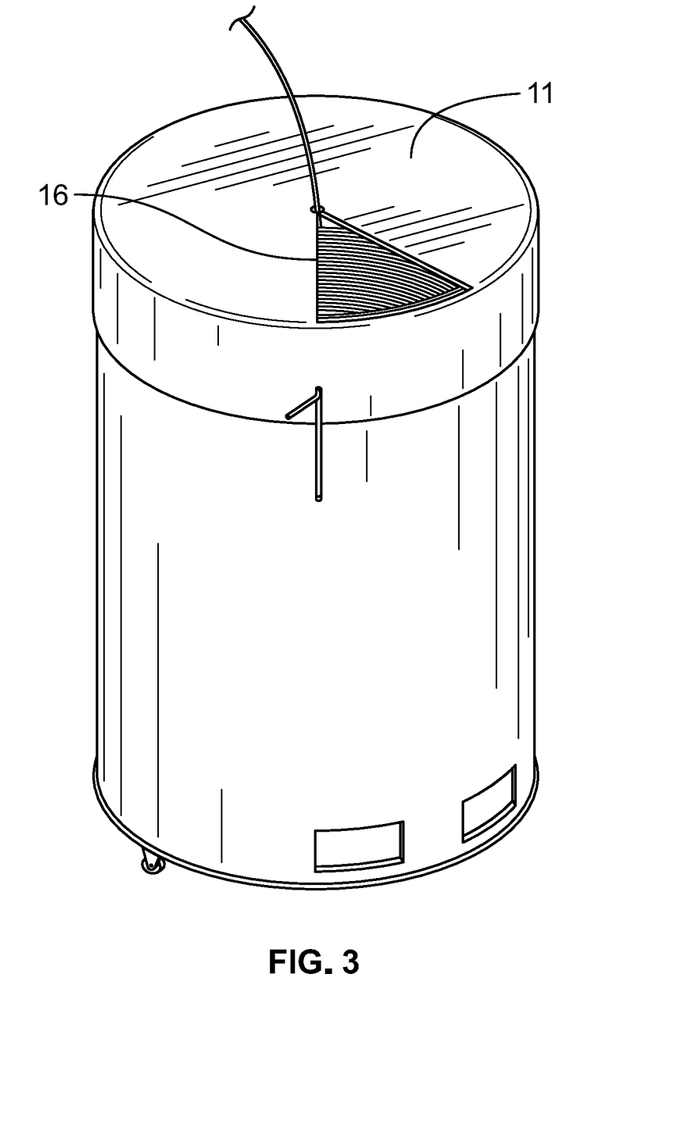
FIG. 3 is a perspective view of a welding wire drum showing the access door partially detached from the end surface.

The end surface 11 of the example drum 10 is a top surface (e.g., based on an intended orientation of the drum 10 when in use). The end surface 11 includes a wire feeding opening 14. Welding wire 30 may pass through the wire feeding opening 14. The example wire feeding opening 14 is located in a central location of the end surface 11. The end surface 11 includes an access door 15. The access door 15 may be defined by an area of the end surface 11 that extends from the wire feeding opening 14. In some examples, the access door 15 is substantially triangular or trapezoidal in shape. The access door 15 may include a sector (in the geometric sense) of the end surface 11 attached on an edge 16 of the access door 15 to the first end surface 11. One side of the access door 15 may be cut or otherwise detached from the end surface 11 to allow the edge 16 of the access door 15 to function as either a hinge, as shown in FIG. 2 or a detachment edge, as shown in FIG. 3. When functioning as a hinge, the edge 16 allows the access door to pivot to enable access to an interior space 40 of the drum 10. Alternatively, when functioning as a detachment edge, the edge 16 allows the access door 15 to be removed to enable access to the interior space 40. The edge 16 may be scored or perforated to better enable the access door 15 to pivot about, or detach from, the edge 16. Adjacent the access door 15 may be located a finger hole 17. The finger hole 17 enables easier lifting of, or access to, the access door 15.

The example drum 10 includes a hold-down bar opening 19 on an outer surface 18 of the drum 10. The hold-down bar opening 19 may extend through the drum lid 13, the drum body 12, or both. The hold-down bar opening 19 may be a hole, a slit, or any other appropriate geometry. The hold-down bar opening 19 allows for a portion of a hold-down bar 50 to extend beyond the outer surface 18 of the drum. The hold-down bar 50 limits movement of the welding wire 30, particularly during transport of the drum 10. The end of the hold-down bar 50 may be bent to prevent the hold-down bar 50 from inadvertently sliding into the drum 10 and to provide easier handling of the hold-down bar 50. The bend in the example hold-down bar 50 is 90 degrees, but may have a greater or lesser angle. The inclusion of a hold-down bar opening 19 provides for access to and removal of the hold-down bar 50 through the hold-down bar opening 19 without prior removal of the drum lid 13. Typically, the hold-down bar 50 is removed before beginning a welding process. Notably, the hold-down bar opening 19 may be used on a drum that is not used for a continuous welding process, including a drum that does not have an access door 15. For ease of use, such a drum could be prepared with a length of welding wire 30 protruding through a wire feeding opening 14 to allow a user to start a non-continuous welding process without first needing to remove the drum lid.

Figure 4:
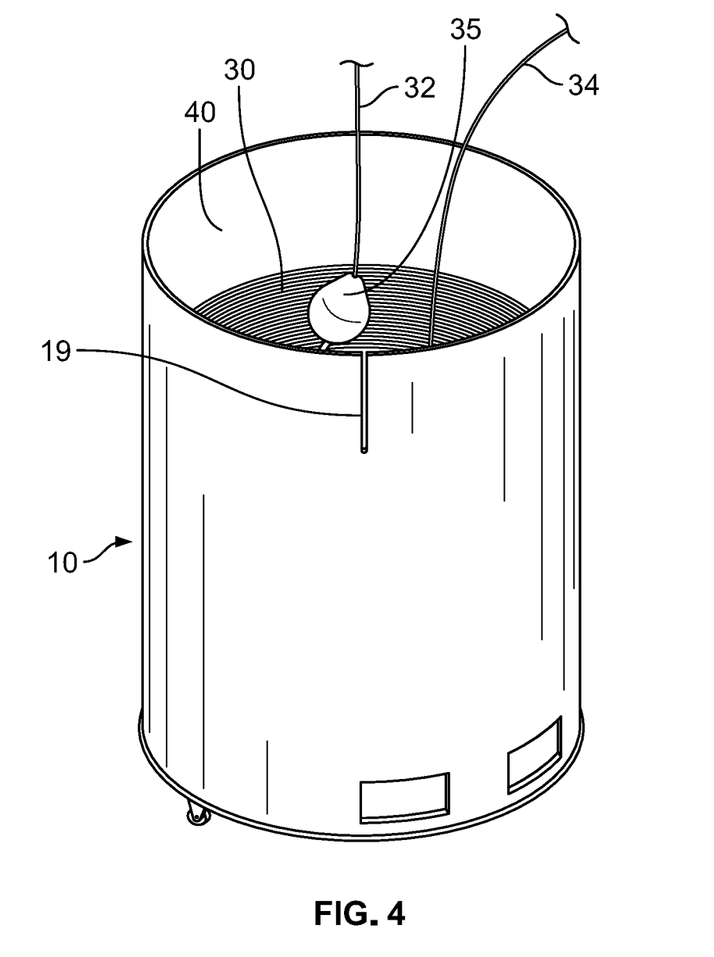
FIG. 4 is a perspective view of a welding wire drum in which the drum lid has been removed to show the interior space of the drum.

As shown in FIG. 4, the interior space 40 of the example drum 10 contains welding wire 30. The welding wire 30 has a starting (e.g., proximal) end 32 and a finishing (e.g., distal) end 34. The drum 10 may be provided with the starting end 32 protruding through the wire feeding opening 14, with a majority of the welding wire located within the interior space 40 of the drum 10, including the finishing end 34. The access door 15 provides access to the finishing end 34 without need for removal of the end surface 11 or drum lid 13.

An anti-tangle ball 35 may be threaded onto the welding wire 30, similar to how a needle may be threaded onto a length of thread. The anti-tangle ball 35 may be used to prevent kinks or bends forming in the wire during welding. The formation of kinks or bends can interrupt the wire feeding process, such that the welding process has to be stopped, which can have detrimental practical and economic consequences. During welding, the anti-tangle ball will advance along the length of the welding wire 30 from the starting end 32 towards the finishing end 34 as the welding wire 30 is drawn. The anti-tangle ball 35 will preferably be formed of a material that has a weight but that is sufficiently lightweight so as not to deform the welding wire 30. The anti-tangle ball 35 should be sized so that it can pass through the space in the end surface 11 defined by the access door 15.

Figure 5:
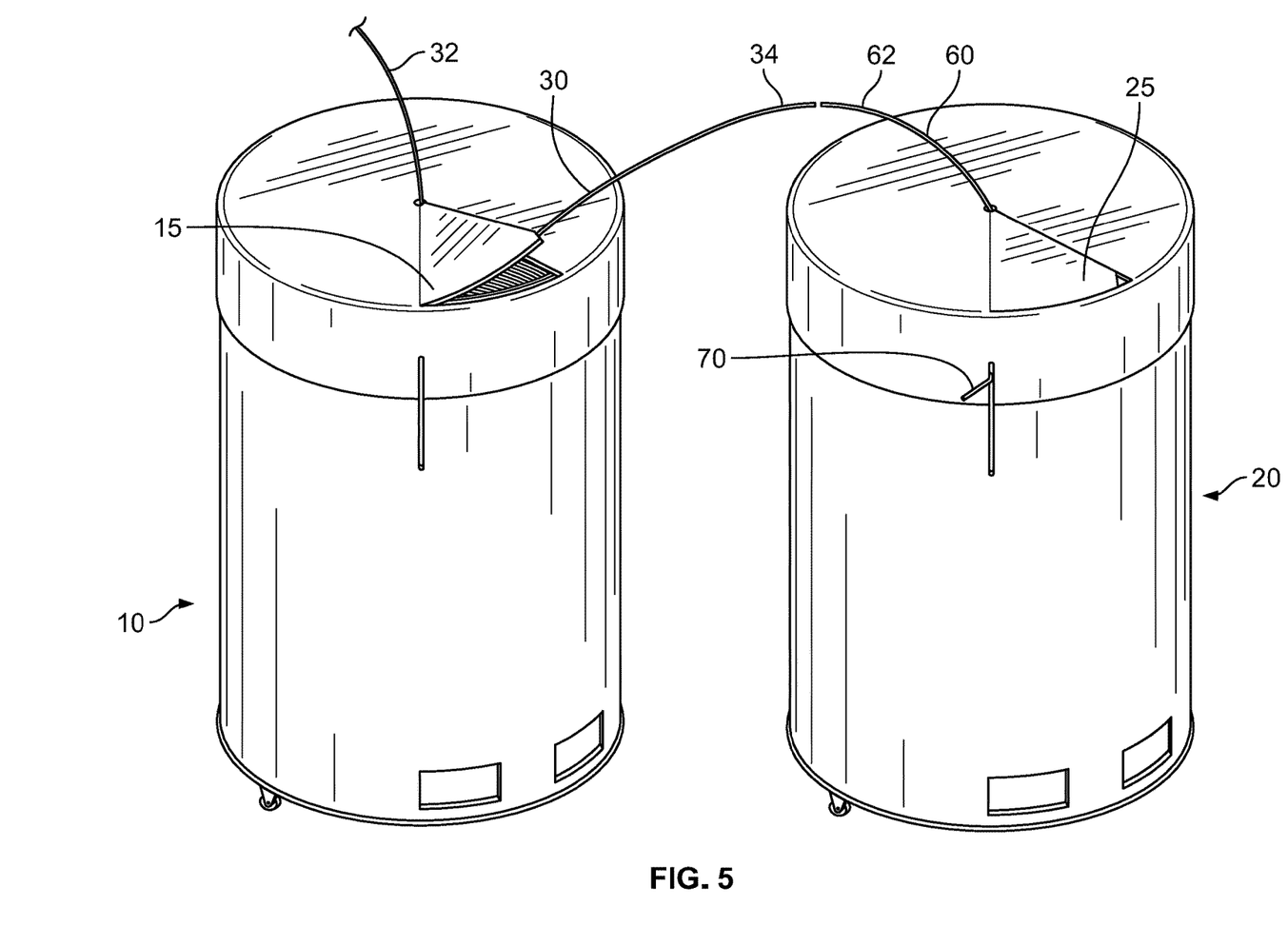
FIG. 5 is a perspective view of two welding wire drums adjacent to each other.

As shown in FIG. 5, a second drum 20 may be placed in relative proximity to a first drum 10. The drums 10, 20 may be adjacent each other, or spaced further apart. Optionally, the access door 15 of the first drum 10 may be placed adjacent the second drum 20. The second drum 20 may comprise an access door 25 to allow access to a second welding wire 60 contained in the second drum 20, including the finishing end 64 of the second welding wire 60. Each of the drums 10, 20 may comprise a hold-down bar 50, 70 (respectively) to limit movement of the welding wires 30, 60, particularly during transport. The hold-down bar 50, 70 for each drum should be removed before beginning a welding process. For example, the hold-down bar 50 may be removed before retrieving the starting end 32 of the first welding wire 30. Similarly, the hold-down bar 70 may be removed prior to retrieving the starting end 62 of the second welding wire 60.

Figure 6:
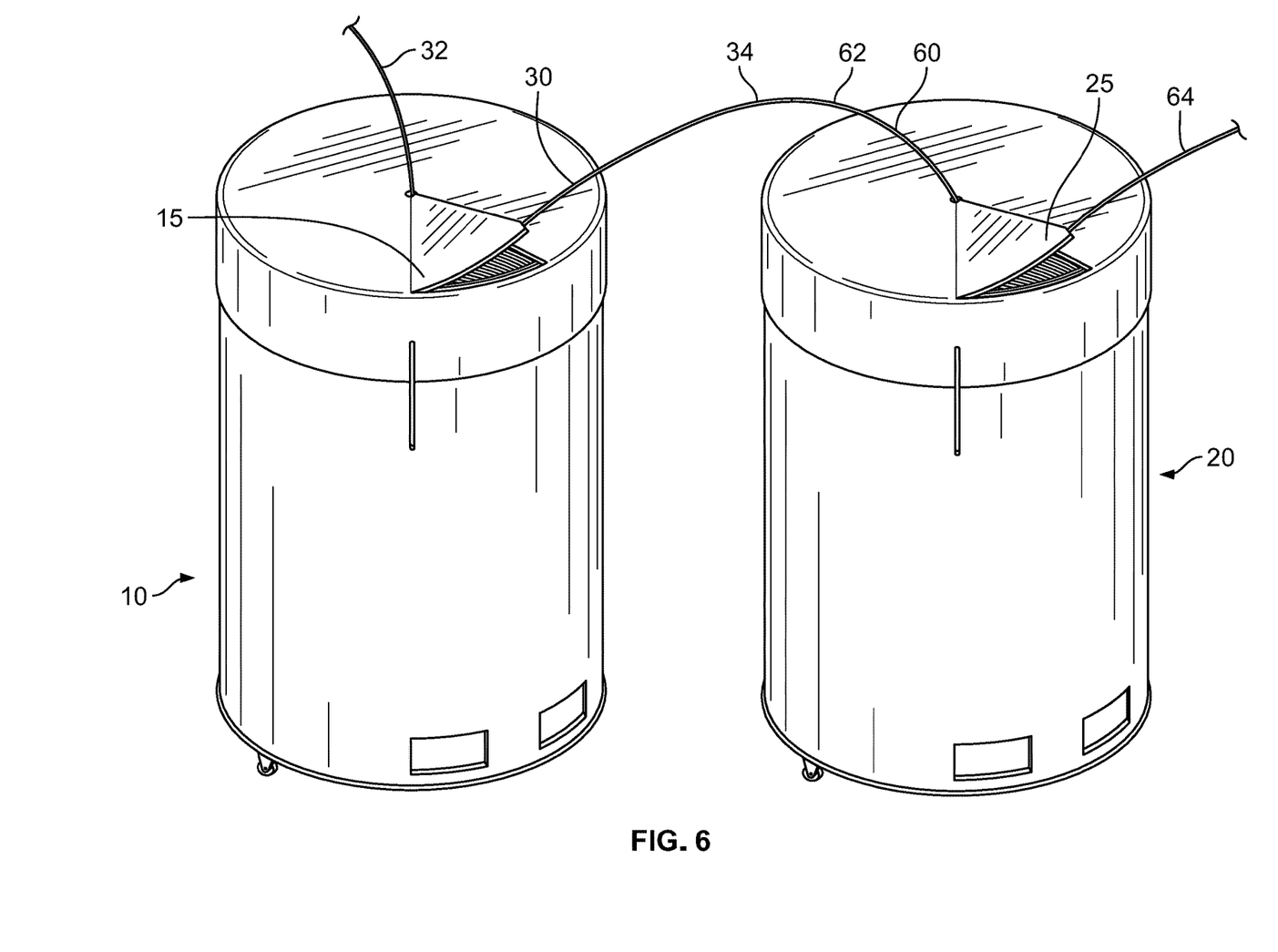
FIG. 6 is a perspective view of two welding wire drums showing how the welding wire of one drum may be joined to the welding wire of a second drum.

As shown in FIG. 6, the finishing end 34 of a first welding wire 30 may be joined to the starting end 62 of a second welding wire 60. The welding wires 30, 60 may be joined by, for example, butt welding. Joining the welding wires 30, 60 allows for a continuous welding process. Towards the end of drawing the first welding wire 30, the anti-tangle ball 35 will advance along the finishing end 34 of the first welding wire 30 onto the starting end 64 of the second welding wire 60.

Advantages of the drum 10 include that the hold-down bar 50 may be removed through the hold-down bar opening 19 without having to first remove the drum lid 13, that it makes it easier to retrieve the finishing end 34 of welding wire 30 via the access door 15 without having to first remove the drum lid 13, and that the drum lid 13 may remain intact during welding (thus limiting the amount of dirt or debris that may enter the interior space 40 during welding). These advantages improve the efficiency of welding processes. In particular, continuous welding processes are made more efficient by using the hold-down bar opening 19 and the access door 15. Further, the risk of needing to stop a continuous welding process.

Some of the elements described herein are identified explicitly as being optional, while other elements are not identified in this way. Even if not identified as such, it will be noted that, in some embodiments, some of these other elements are not intended to be interpreted as being necessary, and would be understood by one skilled in the art as being optional.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A drum for transporting and feeding welding wire comprising:
    an outer surface that defines an interior space, is centered around a longitudinal axis, extends along the longitudinal axis, and at least substantially surrounds a wire that is coiled around the longitudinal axis and that has proximal and distal ends;
    a first end surface at an angle to the longitudinal axis, the first end surface comprising a wire feeding opening; and
    a hold-down bar to limit movement of the wire during transport;
    wherein the outer surface of the drum comprises a hold-down bar opening to allow at least one end of the hold-down bar to protrude out beyond the outer surface of the drum;
    wherein the hold-down bar comprises a bend that protrudes beyond the outer surface of the drum;
    wherein the first end surface of the drum comprises an access door defined at least in part by a gap in the first end surface that extends from the wire feeding opening of the first end surface toward a circumference of the drum, and wherein the access door is configured to enable access to the interior space of the drum when the access door is opened or removed from the first end surface; and
    wherein the first end surface comprises a finger hole adjacent to the access door to assist in opening or removing the access door.

2. The drum of claim 1, wherein the bend comprises an angle of 90 degrees.

3. The drum of claim 1, wherein the wire feeding opening is located in the center of the first end surface.

4. The drum of claim 1, wherein the drum comprises a fiber drum.

5. The drum of claim 1, wherein the access door is openable by pivoting the access door away from the first end surface around a hinge defined by the interface between the access door and the first end surface.

6. The drum of claim 1, wherein the access door is removable by detaching the access door from the first end surface.

7. The drum of claim 1, wherein the access door is substantially triangular or trapezoidal in shape.

8. The drum of claim 1, wherein the access door comprises a geometric sector of the first end surface attached on an edge of the access door to the first end surface.

9. The drum of claim 1, wherein the proximal end of the wire protrudes through the wire feeding opening, and wherein the access door is configured to enable access to the wire inside the drum when the access door is opened or removed from the first end surface.

10. The drum of claim 1, further comprising an anti-tangle ball threaded onto the wire to prevent the wire from tangling or inadvertently deforming.

11. The drum of claim 10, wherein the access door is dimensioned to, when the access door is detached or moved, enable the anti-tangle ball to be removed from the drum via an in situ location of the access door on the first end surface.

12. The drum of claim 1, wherein the drum is prepared with a length of welding wire protruding through the wire feeding opening to allow a user to start a non-continuous welding process without first needing to remove the first end surface.

13. A system for transporting and feeding welding wire comprising a first and second drum according to claim 1, wherein the distal end of the wire of the first drum is welded to the proximal end of the wire of the second drum.

14. The system of claim 13, wherein the first drum is placed adjacent the second drum.

15. The system of claim 14, wherein the first and second drums are aligned such that the access door of the first drum is adjacent to the access door of the second drum.

16. The system of claim 13, further comprising an anti-tangle ball threaded onto the wire to prevent the wire from tangling or inadvertently deforming.

17. The system of claim 13, wherein hold-down bar of both the first and the second drum is removed before welding.

18. The system of claim 13, wherein the first end surface of both the first and the second drum remains intact during welding.

* * * * *